INVENTORS
S. DARWIN NOLL
WILLIAM F. DELFELD
BY
Isler & Ornstein
ATTORNEYS

United States Patent Office 3,298,264
Patented Jan. 17, 1967

3,298,264
CROP PUSHER FOR SLAB SHEARS
AND THE LIKE
Stanley Darwin Noll, Shaker Heights, and William F. Delfeld, Lyndhurst, Ohio, assignors to Production Experts, Inc., Cleveland, Ohio, a corporation of Ohio
Filed June 5, 1964, Ser. No. 372,801
8 Claims. (Cl. 83—135)

This invention relates generally to steel mill equipment, but has reference more particularly to a crop pusher for slab shears and the like.

A crop shear, such as used for removing the crop ends of a slab is usually located at a considerable distance from the rolls of the slab roller, and live rollers transport the rolled slabs between the slab roller and the shear.

The primary function of the crop shear is to remove from the rolled slab sufficient of the back and front ends (corresponding to the top and bottom of the ingot, or vice versa), commonly known as back and front crop ends, so that the sheared slab remaining will meet chemical and metallurgical specifications.

The shearing of the front crop end presents no problem, since this crop end falls by gravity into a pit or space ahead of the lower shear knife. The shearing of the rear crop end does, however, present a problem, because after shearing, this crop end remains on the table or ledge on which the lower shear knife or blade is mounted, and has to be pushed off the table or ledge into the aforesaid pit or space. If it remains on such table or ledge too long, the heat transfer from it to the lower shear knife can result in damage to such knife.

The present invention accordingly has as its primary object the provision of a crop pusher which is effective to quickly and easily push the rear crop end of the slab off the table or ledge in which the lower shear knife is mounted, to thereby avoid damage or injury to said knife.

Another object of the invention is to provide a crop pusher of the character described, which can be quickly and easily retracted or returned to an initial or starting position, in which it does not, in any way, interfere with the movement or progress of succeeding slabs to the shear.

A further object of the invention is to provide a crop pusher of the character described, which consists of a minimum number of parts of relatively simple construction, which can be easily assembled and disassembled for repair or replacement purposes.

Other objects and advantages of our invention will be apparent during the course of the following description.

In the accompanying drawings forming a part of this specification, and in which like numerals are employed to designate like parts throughout the same, FIG. 1 is a top plan view showing the crop pusher in an intermediate position of its movement, and showing also, mechanism for moving or actuating the pusher;

Figure 1:
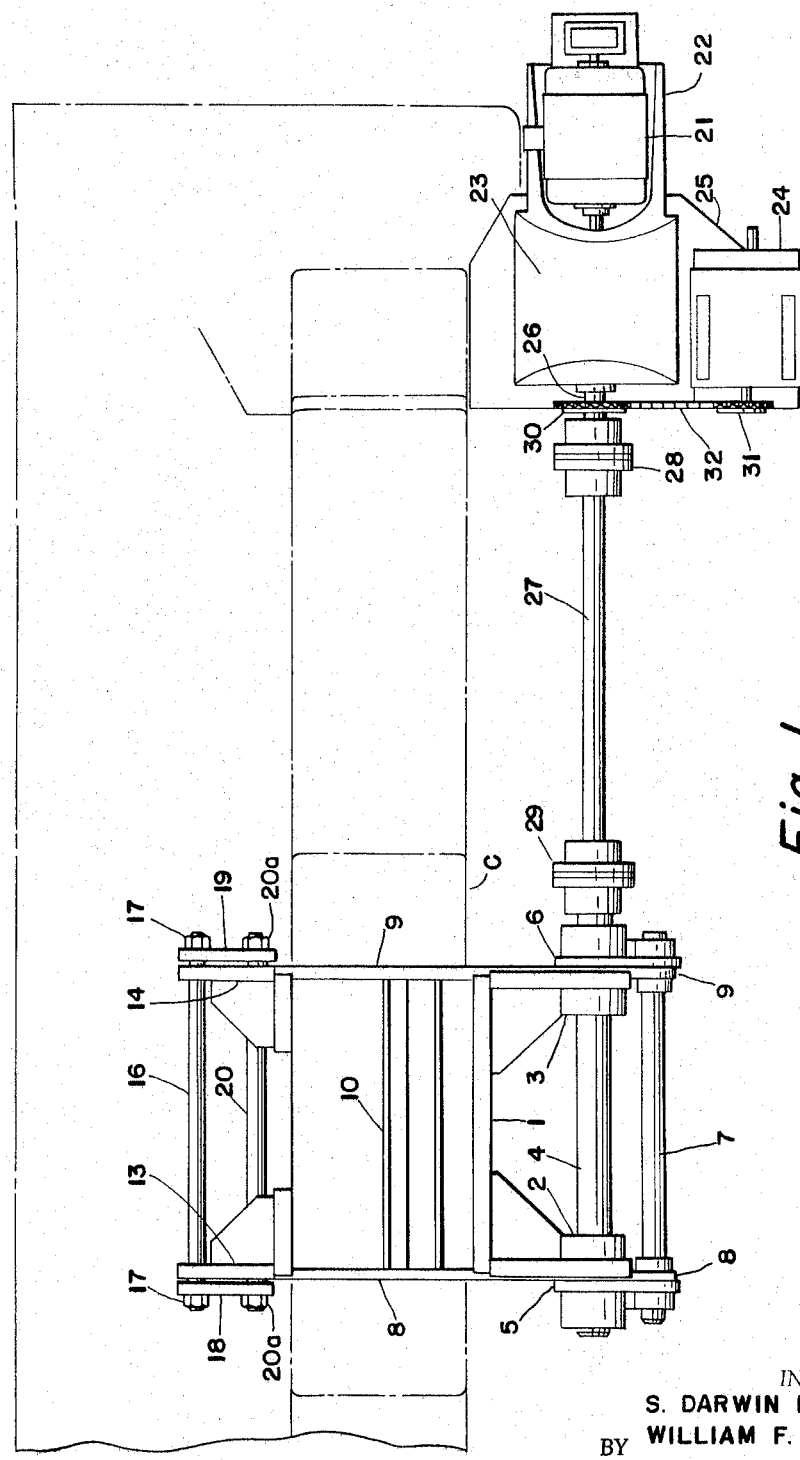

Referring more particularly to the drawings, there is disclosed in broken lines a slab or crop shear comprising an upper knife K and a lower knife K', which coact to remove from a rolled slab portions of the front and back ends of the slab, commonly known as crop ends.

After the front crop end of the slab has been sheared, it falls by gravity into a pit or space below the upper knife K, but the rear crop end of the slab, after being sheared off, remains on the table or ledge L rearwardly of the knife K', and since this rear crop end is very hot, its proximity to the knife K' is such that if it remained on the ledge too long, the heat transfer from it to the knife K' could result in damage to the latter.

It is essential, therefore, that the rear crop end be removed from the ledge L as quickly as possible after it has been sheared from the slab, and for this purpose the crop pusher of the present invention has been provided, the crop pusher being illustrated in solid lines in the drawings.

The cross-beam of the slab shear is indicated at C in the drawings, and has bolted to its rear face a plate 1 having transversely spaced arms 2 and 3 providing bearings in which a shaft 4 is journalled.

The ends of the shaft 4 project beyond the arms 2 and 3 and have keyed thereto pusher arms 5 and 6. The arms 5 and 6 are provided at their rear ends with bearings in which are journalled a shaft 7.

The shaft 7 has keyed to its ends, at the inboard sides of the arms 5 and 6, a pusher member comprising a pair of transversely spaced arms 8 and 9, a beam member 10 interconnecting the arms 8 and 9, and a pusher head 11 interconnecting the forward ends of the arms 8 and 9 and having a lower convex surface 11a. The forward portions of the arms 8 and 9 which extend at an angle to the rear portions of the arms are provided with elongated slots 12, which serve a purpose to be presently described.

Secured, as by bolts, to the front face of the cross-beam C of the shear, is a pair of brackets 13 and 14, each having an inclined elongated slot 15. Mounted in the brackets 13 and 14, with its end portions extending through the slots 15 is a link shaft 16, to the ends of which are secured, as by nuts 17, links 18 and 19, in the general shape of bell-crank levers.

The links 18 and 19 support a shaft 20, the ends of which extend through the slots 12 in the arms 8 and 9 and have nuts 20a secured thereto.

Figure 2:
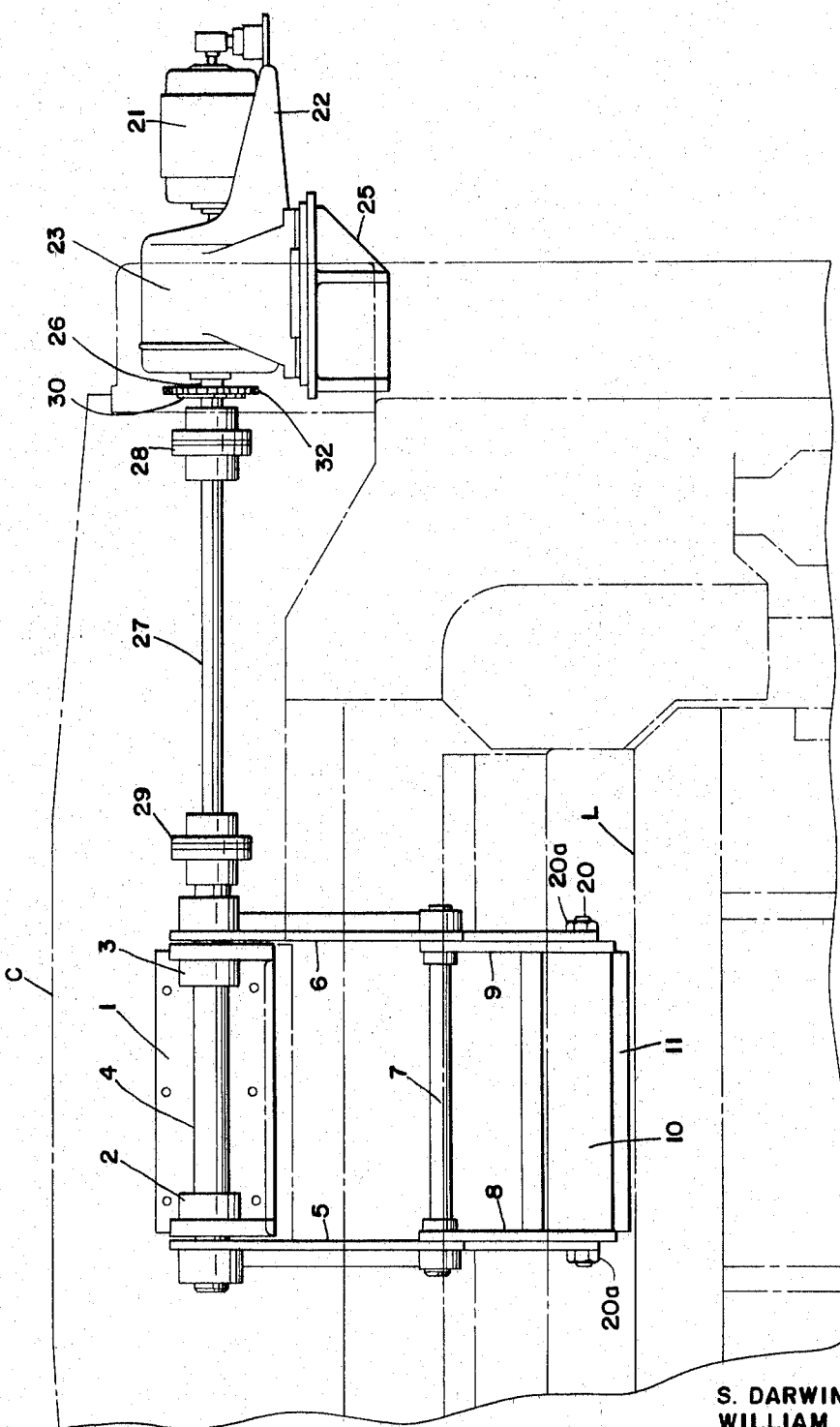
FIG. 2 is a rear elevational view of the crop pusher and actuating mechanism, as viewed from the lower end of FIG. 1.
Figure 3:
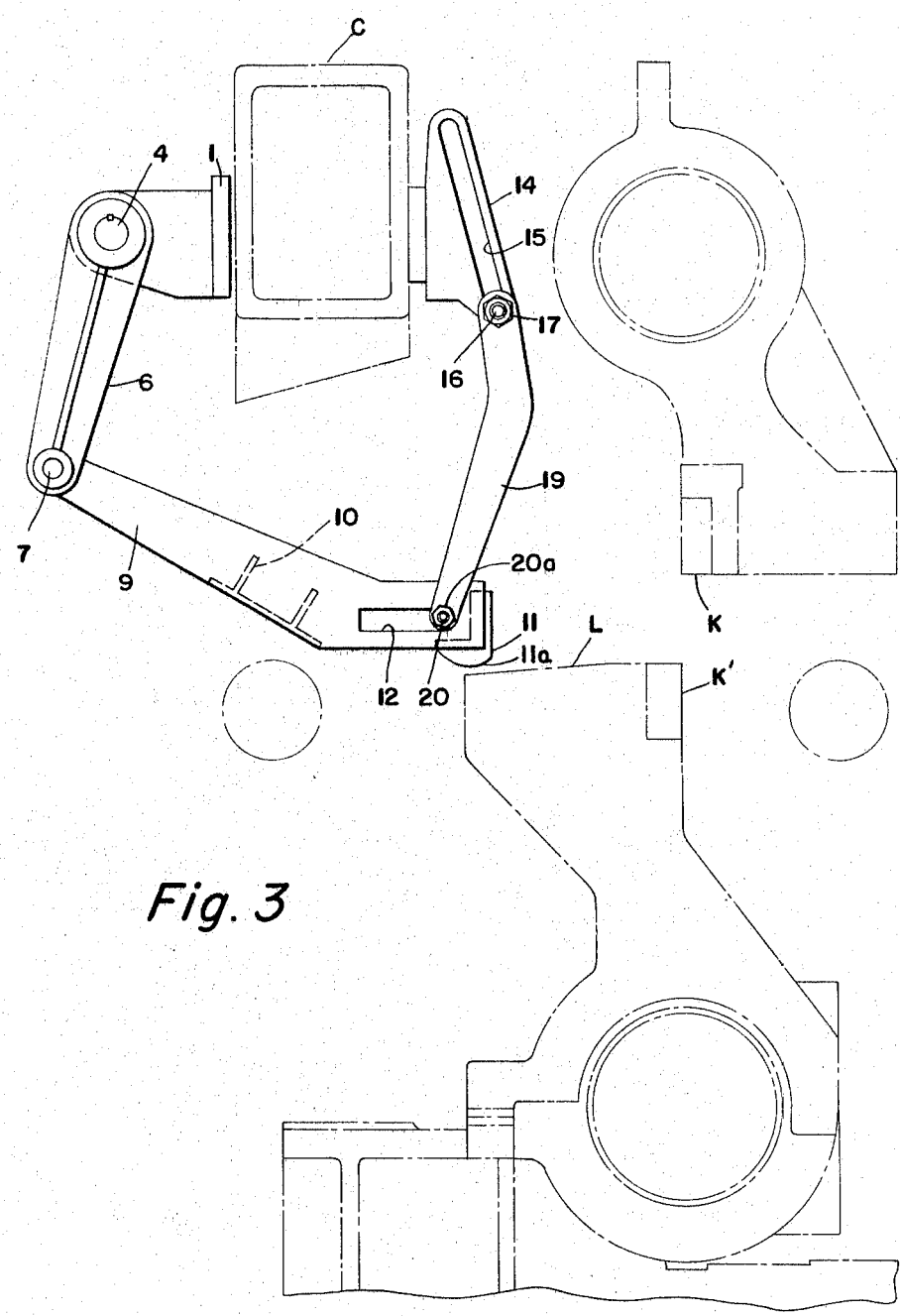
FIG. 3 is a side elevational view of the crop pusher, as viewed from the right side of FIG. 2.
Figure 4:
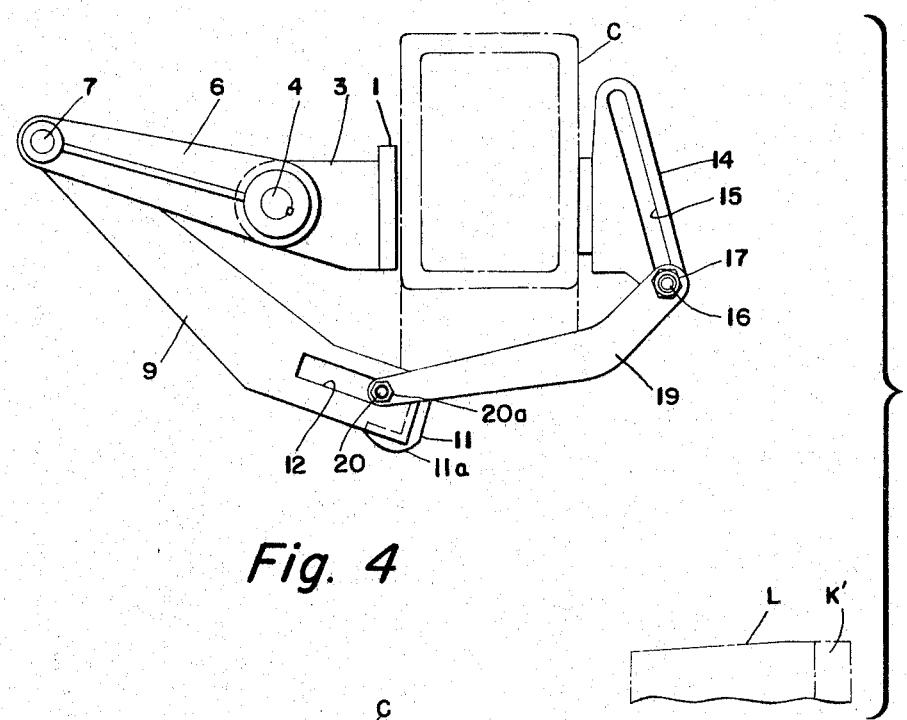
FIG. 4 is a view similar to FIG. 3, but with the parts of the crop pusher in their initial or starting position.
Figure 5:
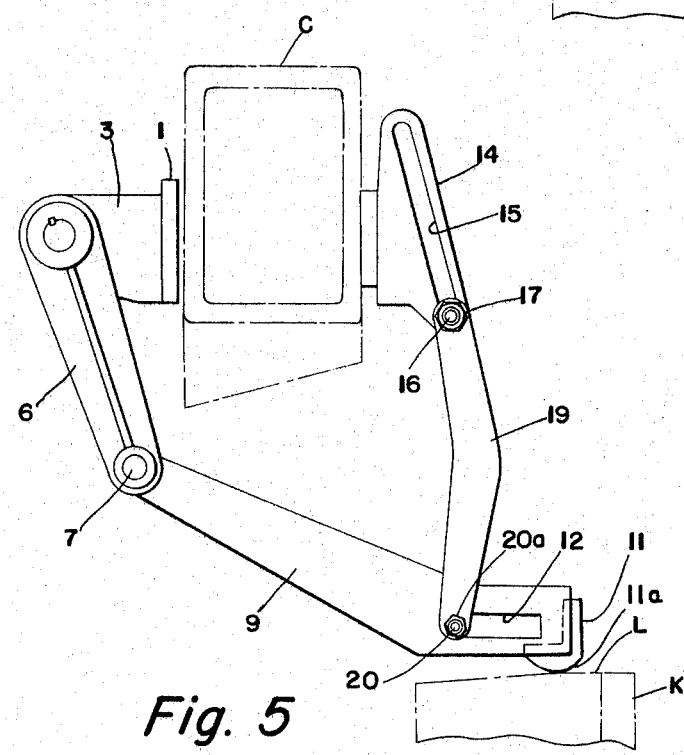
FIG. 5 is a view similar to FIGS. 3 and 4, but with the parts of the crop pusher in their final or forward position.

The crop pusher, as thus described, is adapted to be moved or actuated from an initial or starting position, shown in FIG. 4 to an intermediate position shown in FIGS. 1, 2 and 3, and thence to a forward or final position shown in FIG. 5, after which the pusher is retracted or returned to the initial or starting position shown in FIG. 4.

For the purpose of thus actuating the crop pusher, an electric motor 21 is provided, which is mounted on an extension 22 of the housing of a reducer or reduction unit 23. The reducer 23, together with a cam limit switch or timer 24, is mounted on a bracket 25, which, in turn, is mounted on the slab shear.

The output shaft 26 of the reducer 23 drives an extension shaft 27 through a coupling 28, and the shaft 27, in turn, drives the shaft 4 of the crop pusher through a coupling 29.

The output shaft 26 of the reducer 23 has also mounted thereon a sprocket 30, which drives a sprocket 31 of the limit switch or timer 24, as by an endless belt or roller chain 32.

With the crop pusher in the position shown in FIG. 4, and assuming that the rear crop end of the slab lies on the ledge or table L of the crop shear, the starting button or switch for the motor 21 is pushed. This closes the normally closed limit switch and energizes the timer (limit switch 24) which is set to rotate the shaft of the motor 21 a predetermined number of revolutions to move the pusher head 11 to the position shown in FIGS. 1, 2 and 3, where it engages the rear crop end of the slab, and then to the forward position shown in FIG. 5, at which the crop end drops off the table. The rotation of the motor 21 is then automatically reversed, to thereby return or retract the pusher head 11 to its initial or starting position of FIG. 4 in which it does not interfere with the passage of succeeding slabs to the shear.

It will be noted that the arrangement of the various arms and links of the crop pusher is such that the arms 8 and 9 are quickly lowered from the starting position of FIG. 4 to the intermediate position shown in FIG. 3, after which the arms and the head 11 apply a straight line or direct push against the crop end, so that the crop end is removed from the table L in a minimum length of time. In the course of this direct push, the links 18 and 19, and the shaft 20, act to stabilize the arms 8 and 9 and prevent weaving or wobbling of the pusher member.

When the pusher is retracted or returned to its initial or starting position, the movement is rapid and direct, so that it does not, in any way, interfere with the movement or progress of succeeding slabs to the shear.

The crop pusher consists of a minimum number of parts of relatively simple construction, some of which can be made from plates, bars, or other flat shapes, which can be easily welded to each other. The parts can be easily assembled and disassembled for repair or replacement purposes.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In combination with the cross-beam of a crop shear having front and rear faces, a plate secured to the rear face of said cross-beam, bearing members extending from said plate, a shaft journalled in said bearing members, a pair of spaced arms secured to said shaft, a second shaft supported by said arms, a pusher member secured to said second shaft and adapted to push a crop end from the lower table or ledge of said shear, said pusher member comprising a pair of transversely-spaced arms, a beam member interconnecting said arms, and a pusher head interconnecting the forward ends of said arms, a pair of bracket members secured to the front face of said shear cross-beam, said bracket members having inclined slots therein, a third shaft having end portions extending through said slots, a pair of transversely-spaced links supported by said third shaft, and a fourth shaft supported by said links and extending through the arms of said pusher member.

2. The combination, as recited in claim 1, wherein said arms of said pusher member are provided with elongated slots in which said link-supported shaft is movable.

3. The combination, as recited in claim 2, wherein said pusher head is provided at its bottom with a convex surface.

4. In a crop pusher of the character described: bearing members; a shaft journalled in said bearing members; a pair of spaced arms secured to said shaft; a second shaft supported by said arms; and a pusher member secured to said second shaft, said pusher member consisting of a pair of transversely-spaced arms, a beam member interconnecting said arms, and a pusher head interconnecting the forward ends of said arms; a pair of bracket members spaced forwardly from said first-named shaft, and stabilizing means interconnecting said bracket members and said arms of said pusher member for guiding the movement of said pusher head along a desired path.

5. In a crop pusher of the character described: bearing members; a shaft journalled in said bearing members; a pair of spaced arms secured to said shaft; a second shaft supported by said arms; and a pusher member secured to said second shaft, said pusher member consisting of a pair of transversely-spaced arms, a cross-beam interconnecting said arms, and a pusher head interconnecting the forward ends of said arms; a pair of bracket members spaced forwardly from said first-named shaft; a third shaft carried by said bracket members; a pair of transversely-spaced links supported by said third shaft; and a fourth shaft supported by said links and extending through slots in the arms of said pusher member.

6. In combination with a cross-beam of a corp shear having front and rear faces, a plate secured to the rear face of said cross-beam; bearing members extending from said plate; a shaft journalled in said bearing members; a pair of spaced arms secured to said shaft; a second shaft supported by said arms; and a pusher member secured to said second shaft and adapted to push a crop end from the lower table or ledge of said shear, said pusher member comprising a pair of transversely-spaced arms, a beam member interconnecting said arms, and a pusher head interconnecting the forward ends of said arms; a pair of bracket members secured to the front face of asid shear cross-beam and means interconnecting said pair of bracket members and said arms of said pusher member for guiding the movement of said pusher member along a desired path.

7. In combination with a crop shear having upper and lower coacting knives, and a cross-beam disposed at a level above the upper knife, and a table or ledge adjacent the lower knife; means for pushing a crop end from said table or ledge, said means comprising: a shaft supported by said cross-beam and disposed in spaced relation to the rear face of said cross-beam; a pair of spaced arms secured to said shaft; a second shaft supported by said arms in spaced parallel relation to said first-named shaft; and a pusher member secured to said second shaft and provided with means adapted to push a crop end from said ledge, said pusher member comprising a pair of transversely-spaced arms and a pusher head interconnecting the forward ends of said last-named arms; and a pair of bracket members supported by the front face of said cross-beam and stabilizing means interconnecting said pair of bracket members and said arms of said pusher for guiding the movement of said pusher head along a desired path.

8. In combination with a crop shear having upper and lower coacting knives, and a cross-beam disposed at a level above the upper knife, and a table or ledge adjacent the lower knife; means for pushing a crop end from said table or ledge, said means comprising: a shaft supported by said cross-beam and disposed in spaced relation to the rear face of said cross-beam; a pair of spaced arms secured to said shaft; a second shaft supported by said arms in spaced parallel relation to said first-named shaft; and a pusher member secured to said second shaft and provided with means adapted to push a crop end from said ledge, said pusher member comprising a pair of transversely-spaced arms and a pusher head interconnecting the forward ends of said last-named arms; a pair of bracket members supported by the front face of said cross-beam, said bracket members having slots therein; a third shaft movable in said slots; a pair of transversely-spaced links supported by said third shaft; and a fourth shaft supported by said links and movable in the arms of said pusher member.

References Cited by the Examiner

FOREIGN PATENTS 957,712  2/1957  Germany.

OTHER REFERENCES

German application Sch 14,793, November, 1956, Musly.

ANDREW R. JUHASZ, *Primary Examiner.*